(12) United States Patent
Fujiwara et al.

(10) Patent No.: US 8,494,811 B2
(45) Date of Patent: Jul. 23, 2013

(54) DEVICE MANAGEMENT METHOD, ANALYSIS SYSTEM USED FOR THE DEVICE MANAGEMENT METHOD, ANALYSIS DATA STRUCTURE, AND MAINTENANCE INSPECTION SUPPORT APPARATUS USED FOR THE DEVICE MANAGEMENT METHOD

(75) Inventors: Yoshiyasu Fujiwara, Kakogawa (JP); Kazunori Oda, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 770 days.

(21) Appl. No.: 11/996,542

(22) PCT Filed: Jul. 25, 2006

(86) PCT No.: PCT/JP2006/314691
§ 371 (c)(1),
(2), (4) Date: Feb. 18, 2009

(87) PCT Pub. No.: WO2007/013467
PCT Pub. Date: Feb. 1, 2007

(65) Prior Publication Data
US 2009/0216495 A1    Aug. 27, 2009

(30) Foreign Application Priority Data

Jul. 25, 2005  (JP) ................. 2005-214646
Jul. 26, 2005  (JP) ................. 2005-216145
Jul. 27, 2005  (JP) ................. 2005-217353

(51) Int. Cl.
*G21C 17/00*   (2006.01)
(52) U.S. Cl.
USPC .................. 702/184; 714/2; 714/25

(58) Field of Classification Search
USPC .................. 702/184, 185, 188; 714/2, 25
See application file for complete search history.

(56) References Cited

U.S. PATENT DOCUMENTS

| 3,359,652 | A | * | 12/1967 | Prosser et al. ............... 434/126 |
| 4,788,849 | A | | 12/1988 | Yonemura et al. |
| 4,800,512 | A | | 1/1989 | Busch |
| 5,856,931 | A | | 1/1999 | McCasland |
| 7,082,384 | B2 | * | 7/2006 | Sasaki et al. ............... 702/184 |
| 7,130,804 | B2 | | 10/2006 | Fujiwara |

(Continued)

FOREIGN PATENT DOCUMENTS

| CN | 1629867 A | 6/2005 |
| DE | 3523289 A1 | 1/1987 |

(Continued)

OTHER PUBLICATIONS

Gordon, Jacques, "EVAP Code Blues," Motorage, Jan. 2005.*

*Primary Examiner* — Sujoy Kundu
(74) *Attorney, Agent, or Firm* — The Webb Law Firm

(57) ABSTRACT

A service condition, a cause of a malfunction, or another aspect of a device in a large group of devices to be managed can be analyzed in an accurate and efficient manner. A complete test involving the entire number of devices in a large group of managed devices (T) is periodically performed to determine whether the devices are operating normally or have a malfunction; a test result (Ic) is recorded for each cycle of the complete test, and a device that has been found to be malfunctioning is repaired or replaced; and analysis data G, E are created showing a malfunctioning frequency (N) of each of the managed devices (T) on the basis of the test result (Ic) of the complete test that spans a plurality of cycles.

3 Claims, 8 Drawing Sheets

U.S. PATENT DOCUMENTS

| | | |
|---|---|---|
| 2001/0006384 A1 | 7/2001 | Usaki |
| 2004/0203906 A1 * | 10/2004 | Kato et al. ................ 455/456.1 |
| 2005/0149570 A1 | 7/2005 | Sasaki et al. |

FOREIGN PATENT DOCUMENTS

| | | |
|---|---|---|
| EP | 1 203 910 A2 | 8/2002 |
| JP | 62-246695 | 10/1987 |
| JP | 64088892 A | 4/1989 |
| JP | 08263319 A | 10/1996 |
| JP | 2002-140745 | 5/2002 |
| JP | 2002-2140745 | 5/2002 |
| JP | 2003083849 A | 3/2003 |
| JP | 2003-296475 | 10/2003 |

* cited by examiner

FIG. 4

| Ia | Ib | | | | Ic | | | Id |
|---|---|---|---|---|---|---|---|---|
| AREA NO. / TRAP NO. | MODEL | MANUFACTURER | APPLICATION | PRESSURE | NORMAL OPERATION / MALFUNCTION | MALFUNCTION CATEGORY | LEAKAGE RATE | NUMBER OF MALFUNCTIONS |

DEVICE MANAGEMENT METHOD, ANALYSIS SYSTEM USED FOR THE DEVICE MANAGEMENT METHOD, ANALYSIS DATA STRUCTURE, AND MAINTENANCE INSPECTION SUPPORT APPARATUS USED FOR THE DEVICE MANAGEMENT METHOD

TECHNICAL FIELD

The present invention relates to a technique for managing a large group of steam traps, valves, and other devices installed in a plant.

BACKGROUND ART

An example involving steam traps will now be described. To manage a large group of steam traps (referred to hereinbelow merely as "traps") installed in a plant, a method has conventionally been adopted in which, for example, managed trap Nos. 1 to 200 are selected from a group of 1000 managed traps that are assigned control numbers 1 to 1000, and each of the selected traps is tested for malfunctions in a particular year. Managed trap Nos. 201 to 400 are each tested for malfunctions in the next year, and managed trap Nos. 401 to 600 are each tested for malfunctions in the year after that. In other words, a method is adopted in which partial tests are periodically performed to test only some of the managed traps, and the plurality of managed traps subjected to the partial test is sequentially rotated.

When a malfunctioning device is detected in a group of tested traps being handled during each cycle of partial testing, the malfunctioning trap is replaced or repaired. In cases in which a comprehensive trap management log (e.g., a management database) is created so that a test result is recorded for each and every managed trap, the test result for each trap in a group of tested traps being handled during each cycle of partial testing is added to and recorded in the management log.

The present applicant has previously proposed a steam trap management method (see Patent Document 1 below) that is separate from the above-described management method. According to the proposed method, all the managed traps, i.e., both normally functioning traps and malfunctioning traps, are collectively replaced with recommended traps, a new trap management log is created, a complete test is then periodically performed to determine whether any trap in the entire group of managed traps (i.e., collectively replaced traps) is operating normally or has a malfunction, the test result for each of the tested traps handled during each cycle of complete testing is added to and recorded in the trap management log (i.e., the log is updated), and a trap that has been found to be malfunctioning is replaced or repaired.

[Patent Document 1] Japanese Laid-open Patent Publication No. 2002-140745

DISCLOSURE OF THE INVENTION

Problems that the Invention is Intended to Solve

However, the first of the conventional management methods described above involves sequentially rotating the managed traps being tested during periodic partial testing. The result is that when a test result for each of a group of tested traps subjected to each cycle of partial testing is added to and recorded in a trap management log, mutually different test implementation conditions, such as the test period, the number of tests, and the test interval, are included at the same time in the test result for each managed trap recorded in the trap management log. For this reason, even if an analysis is made of the service conditions of each of the managed traps, the cause of the malfunction, or other information based on the test results for each of the managed traps recorded in the trap management log, the analysis will not be made under identical comparison conditions for each managed trap. A problem is accordingly presented in that inaccuracies will occur when the analysis is made of the service conditions of each of the managed traps, the cause of the malfunction, or other information.

On the other hand, the second of the conventional management methods described above involves periodically performing a complete test for all of the managed traps, and adding to and recording in a trap management log test results for each of the managed traps for each cycle of complete testing. Therefore, if an analysis is to be made of the service conditions of each of the managed traps, the cause of the malfunction, or other information based on the test results for each of the managed traps recorded in the trap management log, the analysis will be performed under the identical comparison conditions (e.g., the test period, the number of tests, and the test interval) for each of the managed traps; and an accurate analysis can be performed in regard to these aspects. Nevertheless, the fact remains that no method has yet to be adequately established for accurately and efficiently allowing an analysis to be performed on the service conditions of each of the managed traps, the cause of the malfunction, or other information.

In view of the above-described situation, a principal object of the present invention is to provide a device management method, an analysis system, and a data structure for analysis that can be used to overcome the above-described problems.

Means for Solving the Problems

A first aspect of the device management method of the present invention is characterized in comprising: periodically performing a complete test involving the entire number of devices in a large group of managed devices to determine whether the devices are operating normally or have a malfunction; recording a test result for each cycle of the complete test; replacing or repairing a device that has been found to be malfunctioning; and creating analysis data indicating the malfunctioning frequency of each managed device based on the test result of a complete test that spans a plurality of cycles.

According to this arrangement, analysis data indicating the malfunctioning frequency (i.e., the number of malfunctions per unit period) of each managed device are created based on the test result of a complete test that spans a plurality of cycles obtained through periodic complete testing. It is accordingly possible to obtain analysis data showing the malfunctioning frequency of each managed device as determined under the same comparison conditions for all of the managed devices (i.e., conditions where the test period, the number of tests, the test interval, and the like are the same).

Accordingly, if an analysis is thus performed using analysis data showing the malfunctioning frequency of each managed device as determined under the same comparison conditions, then in the case that, e.g., a specific device among the managed devices has a higher malfunctioning frequency than the others even if the devices are the same model, it will be possible to make a presumption, with a high degree of certainty, that the problem relates not to the device itself, but to the conditions under which the device in question was installed or used; or otherwise to make an accurate and efficient analysis of the service conditions of each of the managed traps, the cause of the malfunction, or other aspects. The device management method is extremely useful in this regard.

As used with reference to this arrangement, the term "periodic complete test" is not limited to a complete test performed at precise predetermined intervals, but also refers to a complete test performed, for example, approximately every six months, a complete test performed approximately every year, or any other complete test that can be regarded as being performed on a roughly regular basis. The same applies hereinbelow.

Also, the term "malfunctioning frequency of a managed device" does not refer to the malfunctioning frequency of one managed device as such (i.e., the malfunctioning frequency of a single device) but, strictly speaking, refers to the malfunctioning frequency of a device provided to an installation site that accommodates a single managed device. Therefore, a case may be considered in which two malfunctions occur in the managed devices on a single installation site, and the managed devices are replaced each time a malfunction occurs. In such a case, each of the replaced devices experiences only one malfunction as such, but the managed devices on this installation site are considered to have two malfunctions when the malfunctioning frequency is calculated. The same applies hereinbelow.

A second aspect of the device management method of the present invention is characterized in comprising: periodically performing a complete test involving the entire number of devices in a large group of managed devices to determine whether the devices are operating normally or have a malfunction, and classifying each of the managed devices into a plurality of classification categories according to a prescribed classification criterion; recording a test result for each cycle of the complete test; replacing or repairing a device that has been found to be malfunctioning; and creating analysis data indicating the relation between the malfunctioning frequency and the plurality of classification categories for each of the managed devices, or creating analysis data indicating the malfunctioning frequency of each managed device by classification category, based on the test result of a complete test that spans a plurality of cycles and on the classification category to which each of the managed devices belongs.

According to this arrangement, it is possible to determine either set of analysis data under the same comparison conditions for all of the managed devices; i.e., conditions where the test period, the number of tests, the test interval, and the like are the same.

Accordingly, if an analysis is thus performed using analysis data determined under the same comparison conditions, then in the case that, e.g., one of the managed devices that has an "A" classification category has a higher malfunctioning frequency than devices having another classification category, even if the installation conditions are the same, it will be possible to make a presumption, with a high degree of certainty, that the device belonging to the "A" classification category is incompatible with the given installation conditions; or otherwise to make an accurate and efficient analysis of the service conditions of each of the managed traps, the cause of the malfunction, or other aspects. The device management method is extremely useful in this regard.

A third aspect of the device management method of the present invention is characterized in comprising: periodically performing a complete test involving the entire number of devices in a large group of managed devices to determine whether the devices are operating normally or have a malfunction, and classifying each of the managed devices into a plurality of classification categories for each of a plurality of prescribed classification criteria according to the classification criterion; recording a test result for each cycle of the complete test; replacing or repairing a device that has been found to be malfunctioning; and creating analysis data indicating the relation between the malfunctioning frequency and the plurality of classification categories for each of the classification criteria for each of the managed devices, or creating analysis data indicating the malfunctioning frequency of each managed device by classification category for each of the classification criteria, based on the test result of a complete test that spans a plurality of cycles and on the classification category for each of the classification criteria to which each of the managed devices belongs.

According to this arrangement, it is possible to obtain either set of analysis data under the same comparison conditions for all of the managed devices; i.e., conditions where the test period, the number of tests, the test interval, and the like are the same.

Accordingly, if an analysis is thus performed using analysis data determined under the same comparison conditions, then in the case that, e.g., one of the managed devices that belongs to an "A1" classification category in the classification according to an "A" classification criterion and to a "B2" classification category in the classification according to a "B" classification criterion has a higher malfunctioning frequency than other devices, even if the installation conditions are the same, it will be possible to make a presumption, with a high degree of certainty, that the device belonging to the "A1/B2" classification category is incompatible with the given installation conditions; or otherwise to make an accurate and efficient analysis of the service conditions of each of the managed traps, the cause of the malfunction, or other aspects. The device management method is extremely useful in this regard.

A fourth aspect of the device management method of the present invention is characterized in comprising: performing a retest for each cycle of the complete test to determine whether the replaced or repaired device is operating normally or has a malfunction; finishing the replacing or repairing of the device when the device is confirmed to be operating normally as a result of the retest; and when the device is confirmed to be malfunctioning as a result of retesting, repeating the replacing or repairing of the device until the device is confirmed to be operating normally as a result of retesting.

According to this arrangement, the replacing or repairing of the device is performed until the device is confirmed to be operating normally as a result of retesting. It is accordingly possible to prevent a malfunctioning device from being left in a malfunctioning state as a result of a replacement or repair failure in each cycle of the complete test, and to enable the malfunctioning device to be reliably placed in a normal state. It is accordingly possible to increase the validity of analysis data created on the basis of test results for complete tests spanning a plurality of cycles; i.e., the validity of analysis data obtained by determining the malfunctioning frequency of each of the managed devices under the same comparison conditions. It is also possible to increase the accuracy with which such analysis data is used to make analyses of the service conditions of each of the managed traps, the cause of the malfunction, or other information.

A first aspect of the analysis system of the present invention is characterized in comprising: input means for inputting a test result of a complete test involving the entire number of devices in a large group of managed devices to determine whether the devices are operating normally or have a malfunction; storage means for accumulating and storing the test result of each cycle of the complete test that has been input by the input means; and arithmetic means for creating, in accordance with a preset program, analysis data that shows the malfunctioning frequency of each of the managed devices on the basis of the test result of the complete test that spans a plurality of cycles, as stored in the storage means.

According to this arrangement, the test results for each cycle of the complete test are input by the input means, whereas the test results for each cycle of the complete test that have been inputted are accumulated and stored in the storage means. The storage means accordingly stores the test results for a complete test spanning a plurality of cycles.

Since the arithmetic means creates, in accordance with a preset program, analysis data that shows the malfunctioning frequency of each of the managed devices on the basis of the test result of the complete test that spans a plurality of cycles as stored in the storage means, it is possible to obtain analysis data showing the malfunctioning frequency for each of the managed devices as determined under the same comparison conditions for all of the managed devices; i.e., conditions where the test period, the number of tests, the test interval, and the like are the same.

Accordingly, if the analysis data is used to make an analysis of the service conditions of each of the managed traps, the cause of the malfunction, or other information, then it will be possible to make an accurate and efficient analysis in the same manner as with the device management method of the first aspect. The analysis system is extremely useful for device management in this regard.

Furthermore, the fact that the analysis data can be automatically created by the arithmetic means makes it possible to facilitate and streamline the entire analysis operation, including the creation of the analysis data, and hence to facilitate and streamline the entire device management operation.

A second aspect of the analysis system of the present invention is characterized in comprising: input means for inputting a test result of a complete test involving the entire number of devices in a large group of managed devices to determine whether the devices are operating normally or have a malfunction, and a classification category to which each of the managed devices belongs;

storage means for accumulating and storing the test result of each cycle of the complete test that has been input by the input means, and for storing the associated classification category for each of the managed devices as input by the input means; and arithmetic means for creating, in accordance with a preset program, analysis data indicating the relation between the malfunctioning frequency and the plurality of classification categories for each of the managed devices, or analysis data that shows the malfunctioning frequency of each of the managed devices by classification category, based on the test result of the complete test that spans a plurality of cycles and the associated classification category to which each of the managed devices belongs, as stored in the storage means.

According to this arrangement, the test results for each cycle of the complete test are input by the input means, whereas the test results for each cycle of the complete test that have been inputted are accumulated and stored in the storage means. The storage means accordingly stores the test results for a complete test spanning a plurality of cycles, while also storing the associated classification category to which each of the managed devices belongs, as input by the input means.

The arithmetic means creates, in accordance with a preset program, either of two sets of analysis data on the basis of the test result of the complete test that spans a plurality of cycles, and the classification category to which each of the managed devices belongs, as stored in the storage means. The creating of this data accordingly makes it possible to obtain analysis data under the same comparison conditions for all of the managed devices; i.e., conditions where the test period, the number of tests, the test interval, and the like are the same.

Accordingly, if the analysis data is used to make an analysis of the service conditions of each of the managed traps, the cause of the malfunction, or other information, based on the relationship with the plurality of classification categories, then it will be possible to make an accurate and efficient analysis in the same manner as with the device management method of the second aspect. The analysis system is extremely useful for device management in this regard.

Furthermore, the fact that the analysis data can be automatically created by the arithmetic means makes it possible to facilitate and streamline the entire analysis operation, including the creation of the analysis data, and hence to facilitate and streamline the entire device management operation.

A third aspect of the analysis system of the present invention is characterized in having: input means for inputting a test result of a complete test involving the entire number of devices in a large group of managed devices to determine whether the devices are operating normally or have a malfunction, and a classification category for each of a plurality of predetermined classification criteria to which each of the managed devices belongs; storage means for accumulating and storing the test result of each cycle of the complete test that has been input by the input means, and for storing the associated classification category for each of the classification criteria for each of the managed devices as input by the input means; and arithmetic means for creating, in accordance with a preset program, analysis data indicating the relation between the malfunctioning frequency and the plurality of classification categories for each of the classification criteria for each of the managed devices, or analysis data that shows the malfunctioning frequency of each of the managed devices by classification category for each of the classification criteria, based on the test result of a complete test that spans a plurality of cycles and the associated classification category for each of the classification criteria to which each of the managed devices belongs, as stored in the storage means.

According to this arrangement, the test results for each cycle of the complete test are input by the input means, whereas the test results for each cycle of the complete test that have been inputted are accumulated and stored in the storage means. The storage means accordingly stores the test results for a complete test spanning a plurality of cycles, while also storing the associated classification category for each of the classification criteria to which each of the managed devices belongs, as input by the input means.

The arithmetic means creates, in accordance with a preset program, either of two sets of analysis data on the basis of the test result of the complete test that spans a plurality of cycles, and the classification category for each of the classification criteria to which each of the managed devices belongs, as stored in the storage means. The creating of this data accordingly makes it possible to obtain analysis data under the same comparison conditions for all of the managed devices; i.e., conditions where the test period, the number of tests, the test interval, and the like are the same.

Accordingly, if the analysis data is used to make an analysis of the service conditions of each of the managed traps, the cause of the malfunction, or other information, based on the relationship with the plurality of classification categories for each of the classification criteria, then it will be possible to make an accurate and efficient analysis in the same manner as with the device management method of the third aspect. The analysis system is extremely useful for device management in this regard.

Furthermore, the fact that the analysis data can be automatically created by the arithmetic means makes it possible to facilitate and streamline the entire analysis operation, including the creation of the analysis data, and hence to facilitate and streamline the entire device management operation.

A first aspect of the analysis data structure of the present invention is a data structure for analysis data created for a device management in which a complete test involving the entire number of devices in a large group of managed devices is periodically performed to determine whether the devices are operating normally or have a malfunction, a test result is recorded for each cycle of the complete test, and a device that has been found to be malfunctioning is replaced or repaired; wherein the analysis data structure is characterized in being constituted to display a malfunctioning frequency for each of the managed devices as determined on the basis of test results of the complete test spanning a plurality of cycles.

According to this arrangement, analysis data is used to display the malfunctioning frequency for each of the managed devices; i.e., the malfunctioning frequency determined under the same comparison conditions for all of the managed devices (conditions where the test period, the number of tests, the test interval, and the like are the same), as determined on the basis of test results of a complete test spanning a plurality of cycles, obtained using periodic complete tests.

Accordingly, if an analysis is made of the service conditions of each of the managed traps, the cause of the malfunction, or other information, based on the malfunctioning frequency for each of the managed devices as displayed, then it will be possible to make an accurate and efficient analysis in the same manner as with the device management method of the first aspect. The analysis system is extremely useful for device management in this regard.

A second aspect of the analysis data structure of the present invention is a data structure for analysis data created for a device management in which a complete test involving the entire number of devices in a large group of managed devices is periodically performed to determine whether the devices are operating normally or have a malfunction, each of the managed devices is classified into a plurality of classification categories according to a prescribed classification criterion, a test result is recorded for each cycle of the complete test, and a device that has been found to be malfunctioning is replaced or repaired; the analysis data structure characterized in being constituted to display the relation between the malfunctioning frequency and plurality of classification categories for each of the managed devices, or display the malfunctioning frequency for each of the managed devices by classification category, as determined on the basis of test results of the complete test spanning a plurality of cycles, and on the basis of the classification category to which each of the managed devices belongs.

According to this arrangement, analysis data is used to display the relation between the malfunctioning frequency and the plurality of classification categories for each of the managed devices as determined under the same comparison conditions for all of the managed devices (i.e., conditions where the test period, the number of tests, the test interval, and the like are the same), or the malfunctioning frequency of each of the managed devices by classification category as determined under the same comparison conditions for all of the managed devices.

Accordingly, if an analysis is made, in regard to the relationship with the plurality of classification categories, of the service conditions of each of the managed traps, the cause of the malfunction, or other information, based on the relation between the malfunctioning frequency and the plurality of classification categories for each of the managed devices, or the malfunctioning frequency of each of the managed devices by classification as displayed, then it will be possible to make an accurate and efficient analysis in the same manner as with the device management method of the second aspect. The analysis system is extremely useful for device management in this regard.

A third aspect of the analysis data structure of the present invention is a data structure for analysis data created for a device management in which a complete test involving the entire number of devices in a large group of managed devices is periodically performed to determine whether the devices are operating normally or have a malfunction, each of the managed devices is classified into a plurality of classification categories for each of a plurality of prescribed classification criteria according to each of the classification criteria, a test result is recorded for each cycle of the complete test, and a device that has been found to be malfunctioning is replaced or repaired; the analysis data structure characterized in being constituted to display the relation between the malfunctioning frequency and plurality of classification categories for each of the classification criteria for each of the managed devices, or display the malfunctioning frequency for each of the managed devices by classification category for each of the classification criteria, as determined on the basis of test results of the complete test spanning a plurality of cycles, and on the basis of the classification category for each of the classification criteria to which each of the managed devices belongs.

According to this arrangement, analysis data is used to display the relation between the malfunctioning frequency and the plurality of classification categories for each of the classification criteria for each of the managed devices as determined under the same comparison conditions for all of the managed devices (i.e., conditions where the test period, the number of tests, the test interval, and the like are the same), or the malfunctioning frequency of each of the managed devices by classification category for each of the classification criteria as determined under the same comparison conditions for all of the managed devices.

Accordingly, if an analysis is made, in regard to the relationship with the plurality of classification categories for each of the classification criteria, of the service conditions of each of the managed traps, the cause of the malfunction, or other information, based on the relation between the malfunctioning frequency and the plurality of classification categories for each of the classification criteria for each of the managed devices, or the malfunctioning frequency of each of the managed devices by classification category for each of the classification criteria as displayed, then it will be possible to make an accurate and efficient analysis in the same manner as with the device management method of the third aspect. The analysis system is extremely useful for device management in this regard.

The analysis data used in the implementation according to the aforedescribed aspects may be written data printed on paper or the like, electronic data displayed on a computer display, or any other type of data capable of displaying content.

The display mode for the variety of relations indicated based on the analysis data when the aforedescribed aspects are implemented is not limited to a display mode that uses graphs, tables, or formulae to show the relation, and includes display modes in which the relations are indicated using drawings, symbols, colors, and the like.

The mode for displaying the malfunctioning frequency in the analysis data is not limited to a numeric display of the frequency, and includes a numeric display of the number of malfunctions assuming that the sampling period is the same for all of the managed devices, and also includes a display mode for visually depicting the frequency and number of malfunctions using graphs, tables, drawings, symbols, colors, or the like.

Another main subject matter of the present invention is a maintenance inspection support apparatus for performing maintenance inspection of a device installed in a plant based on a guideline selected from a plurality of maintenance inspection guidelines. The maintenance inspection support apparatus of the present invention comprises: a device layout data management unit for managing layout data of the device as obtained from device arrangement chart data that has been entered; a device attribute value acquisition unit for acquiring a problem device attribute value that has been identified using an identification code read from an ID tag attached to a problem device, which is to be subjected to a maintenance inspection and which is specified while device layout data managed by the device layout data management unit is being referenced; a device test data acquisition unit for acquiring device test data for the problem device; a device evaluation data generator for combining, for each device, the device attribute value acquired by the device attribute value acquisition unit and the device test data acquired by the device test data acquisition unit, and generating device evaluation data; a database management unit for appending a history code allowing the device evaluation data to be managed as a history, registering the device evaluation data in a database, and extracting device evaluation data that conforms to a search condition; a classification processor for classifying the device evaluation data while accessing the database via the database management unit, and referencing a classification criteria table; a device analysis processor for performing a historical evaluation of the device evaluation data extracted from the database or the device evaluation data classified by the classification processor, and analyzing an operating state of the device; and a display unit for displaying analysis results obtained using the device analysis processor.

An important point regarding the maintenance inspection support apparatus shall be described below. In order for the analysis results obtained using the device analysis processor, or other data, to be used for managing the maintenance inspection operation of a plant, the device analysis processor computes graphs and evaluation maps showing the malfunctioning frequency of the devices based on the analysis results or device evaluation data obtained from the database via the database processing unit. These graphs and maps are displayed on the display unit, and the device status can be readily ascertained.

There follow three examples of data types that can be acquired as device evaluation data.

A first type is analysis data for indicating a malfunctioning frequency (the number of malfunctions per unit period) obtained on the basis of test results of a plurality of cycles of a periodic complete test pertaining to each device to be managed.

If such analysis data is used, then in the case that, e.g., a specific device among managed devices of the same type has a higher malfunctioning frequency than the others, then it will be possible to presume that the problem relates not to the device itself, but to the conditions under which the device in question was installed or used. It will also be possible to make an accurate and efficient analysis of the service conditions of each of the managed traps, the cause of the malfunction, or other aspects.

A second type is analysis data for indicating a malfunctioning frequency of a managed device for each classification category to which the managed device belongs, on the basis of test results of a plurality of cycles of a periodic complete test pertaining to each device to be managed.

An application-based classification category is provided; e.g., managed devices used in normal pipework, and managed devices used for main pipelines; the malfunctioning frequency of the managed device is measured for each of the classification categories; and the analysis data is obtained. Using analysis data obtained in this manner makes it possible to presume that in the case that a managed device having a specific classification category has a high malfunctioning frequency even if the installation conditions are the same, it will be possible to presume that the device having that classification category is incompatible with the given installation conditions. It is accordingly possible to make an accurate and efficient analysis of the service conditions of each of the managed traps, the cause of the malfunction, or other aspects.

A third type is analysis data for indicating a malfunctioning frequency of a managed device for a classification criterion to which the managed device belongs, on the basis of test results of a plurality of cycles of a periodic complete test pertaining to each device to be managed.

"Classification criterion" refers, e.g., to a pipework application to which a managed device is attached, and a configuration of a managed device. Classification criteria are further broken into classification categories. For example, the classification categories described above, such as the devices used in normal pipework and the devices used in main pipelines, are grouped under the single classification criterion referred to as "applications. T" Classification categories such as "float-type," "bucket-type," and "disk-type" are grouped under the single classification criterion referred to as "configurations." The malfunctioning frequency of managed devices according to classification criteria is obtained using these established groupings, whereby, in the case that a managed device belonging to a specific plurality of classification criteria has a high malfunctioning frequency, it will be possible to presume that the device in question is incompatible with the installation conditions. It is accordingly possible to make an accurate and efficient analysis of the service conditions of each of the managed traps, the cause of the malfunction, or other aspects.

BRIEF DESCRIPTION OF THE DRAWINGS

FIG. 4 is view showing the display mode of a management database.

KEY

T Managed device
Ic Test result
N Malfunctioning frequency
G, E Analysis data

2 Input means
14a, 14b Input means
17 Storage means
Pb Preset program
16 Arithmetic means

BEST MODE FOR CARRYING OUT THE INVENTION

Figure 1:
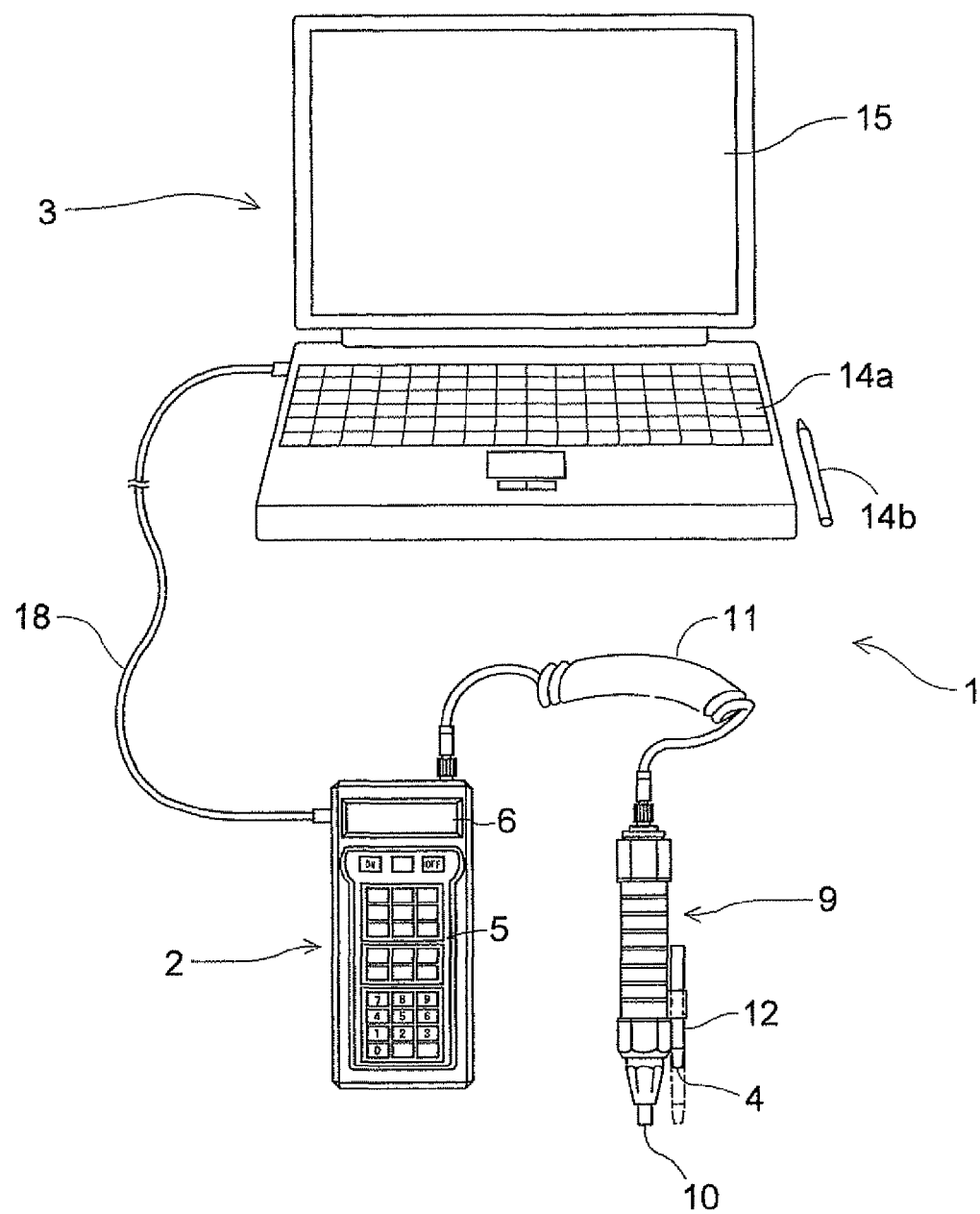
FIG. 1 is a perspective view of a management unit.
Figure 2:
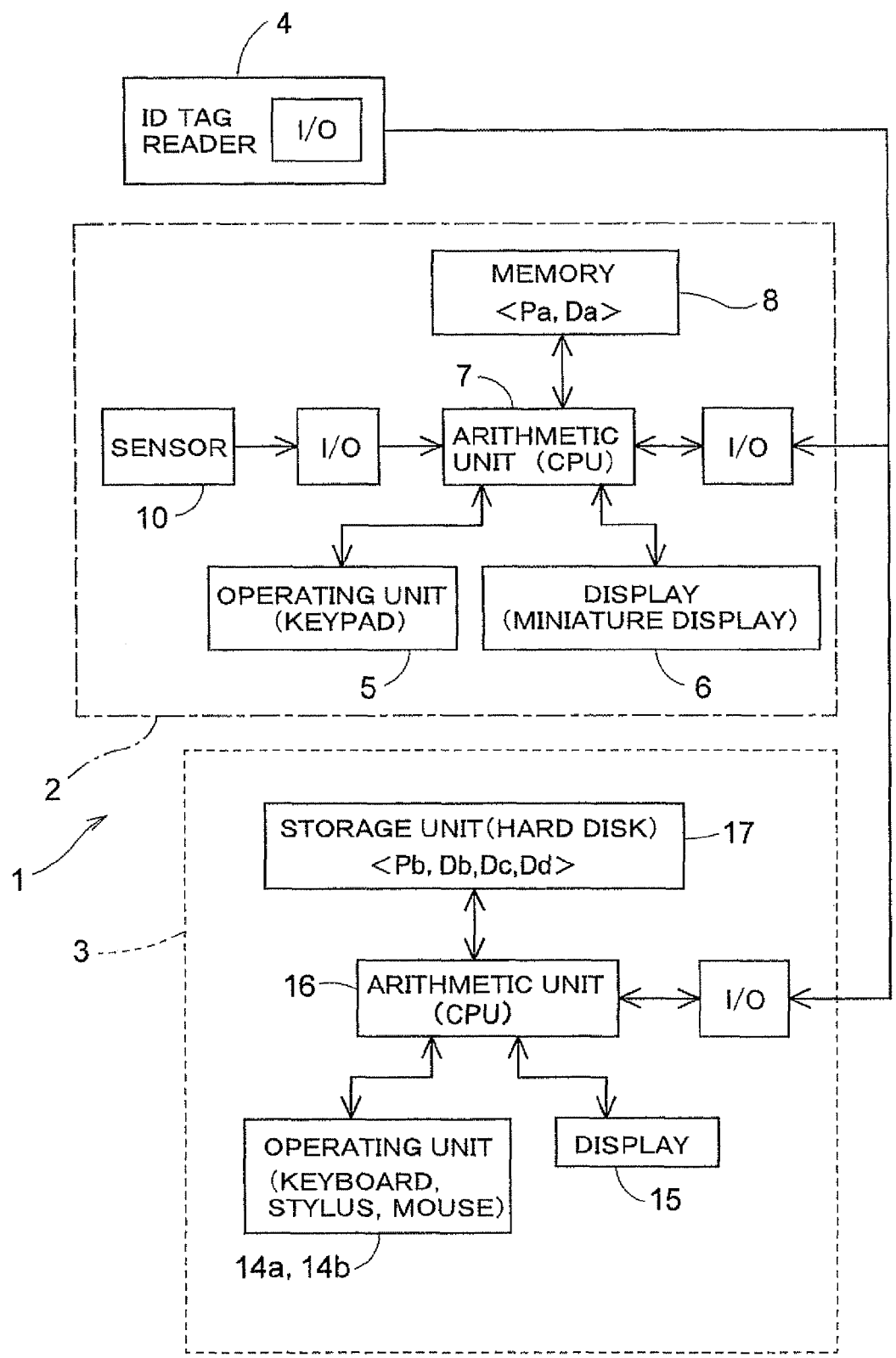
FIG. 2 is a circuit diagram of the management unit.

FIGS. 1 and 2 show a management unit 1 used in the management of a large group of vapor traps T installed in a chemical plant or other vapor-using facility. The management unit 1 is composed of a testing unit 2, a portable personal computer 3 (abbreviated as "portable PC" hereinbelow), and an ID tag reader 4.

The testing unit 2 has a keypad 5 as an operating unit, a miniature display 6 as a display unit, an internal CPU 7 (central processing unit) as an arithmetic unit, and an internal memory 8 as a storage unit. A testing program Pa is stored in the memory 8. The testing unit 2 operates in accordance with the testing program Pa executed by the CPU 7.

Figure 3:
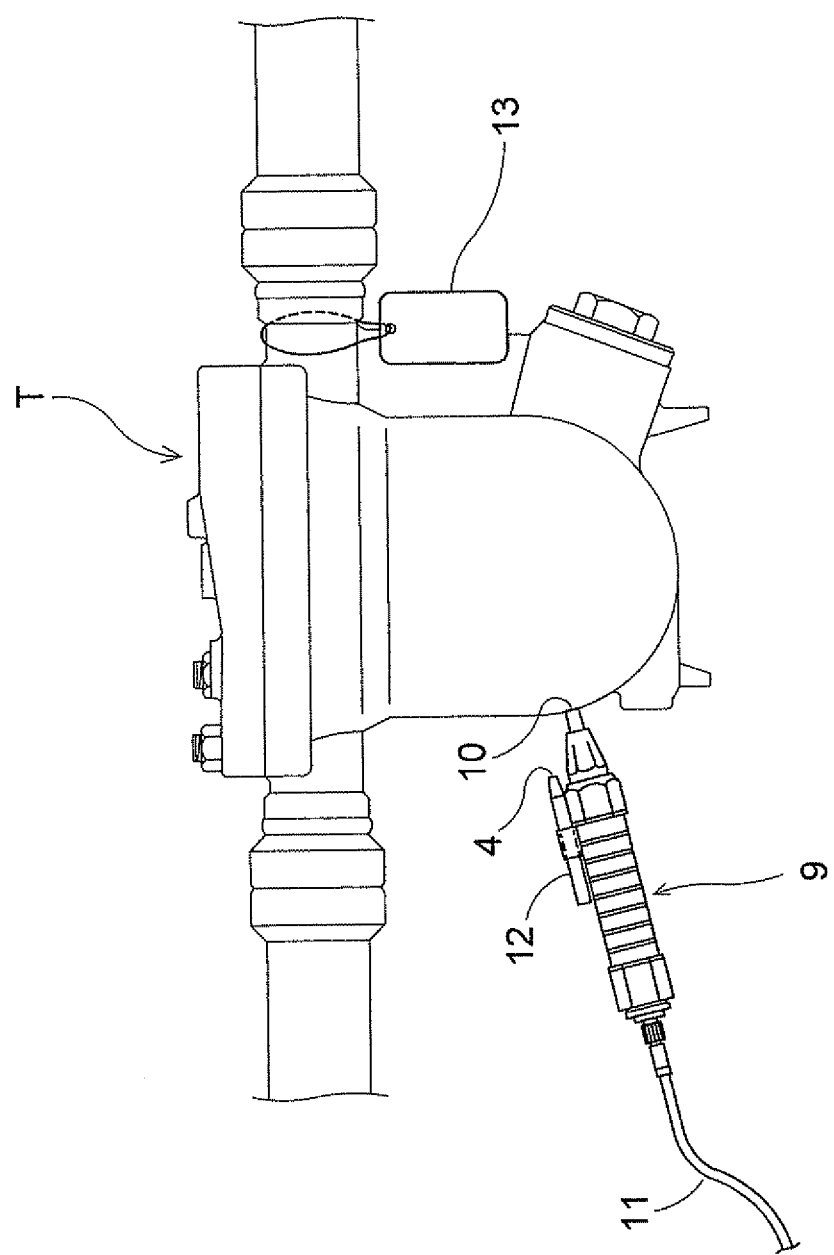
FIG. 3 is a perspective view showing a test mode.

The testing unit 2 has a probe 9. The distal end of the probe 9 is provided with a sensor 10 for detecting the supersonic vibrations and temperature at an external surface of a trap T while pressed against the external surface of the trap, as shown in FIG. 3. Vibration and temperature signals sensed by the sensor 10 are input to the testing unit 2 via a connecting cord 11 (or an infrared communication means or other wireless communication means).

The ID tag reader 4 is provided to the distal end of an arm 12 mounted on the probe 9, with the arm being able to be switched between the extended position shown by the broken line and the retracted position shown by the solid line. When the ID tag reader 4 is brought close to an ID tag 13 attached in the vicinity of each tested trap while the arm 12 is extended, the area number, trap number, and other trap identification information Ia of the corresponding trap T recorded in the ID tag 13 are read by the ID tag reader 4 and are input to the testing unit 2.

The portable PC 3 has a keyboard 14a, stylus 14b, and mouse (not shown) as operating units; a display 15 as a display unit; an internal CPU 16 as an arithmetic unit; and an internal hard disk 17 as a storage unit. A management program Pb is stored on the hard disk 17. The portable PC 3 operates in accordance with the management program Pb executed by the CPU 16.

The portable PC 3 can have two-way communication with the testing unit 2 via a connecting cord 18 (or an infrared communication means or other wireless communication means). The trap identification information Ia that is read by the ID tag reader 4 is input to the testing unit 2 and the portable PC 3.

The memory 8 of the testing unit 2 stores the model, application, service vapor pressure, and other types of trap attribute information Ib of each of the tested traps T. The testing unit 2 retrieves from the memory 8 the trap attribute information Ib of the tested trap T specified by the trap identification information Ia that was read by the ID tag reader 4. The trap attribute information Ib thus read and the vibrations and temperature sensed by the sensor 10 are evaluated using determination criteria information Da. The determination criteria information Da may, for example, include tables for calculating the vapor leakage rate or the like from the trap model, temperature, and vibration. The determination criteria information Da is stored in the memory 8. Obtaining the vapor leakage rate as a result of the evaluation makes it possible to determine whether the tested trap T is operating normally or has a malfunction. In addition, the malfunction category can also be determined, such as whether the leak is large, medium, or small, whether there is a blowout or an obstruction, or the like.

The testing unit 2 stores the following information in the memory 8: trap reference information Id that may include a test date, notes, and a plurality of other entries that are input by operating the keypad 5 or the like for each of the tested traps T, and the results of determining whether the traps operate normally or have a malfunction, as well as the results of determining the malfunction category as trap test results Ic (trap test information). In the process, the trap test results Ic are correlated with the trap identification information Ia and trap attribute information Ib. These types of information are also transmitted to the portable PC 3.

In the testing unit 2, the four types of information Ia, Ib, Ic, and Id about the tested traps T specified by the trap identification information Ia that was read by the ID tag reader 4 (or information about the tested traps T specified by operating the keypad 5 or in any other way) are displayed on the miniature display 6 in scrollable form.

The hard disk 17 of the portable PC 3 stores a management database Db in which the trap attribute information Ib about the tested traps T (i.e., managed traps), the trap test results Ic of each of the tests performed by the testing unit 2, the trap reference information Id, and the like are recorded in relation with the trap identification information Ia. In the portable PC 3 that has received the trap test results Ic from the testing unit 2, a database update function is initiated, and the trap test results Ic and trap reference information Id are cumulatively recorded in the management database Db for the specified tested traps T.

The management database Db may not have any entries of the managed traps T that correspond to the trap identification information Ia read by the ID tag reader 4. When this happens, the portable PC 3 creates a record as a database creation function wherein an entry that is related to the managed traps T (i.e., unrecorded traps) and corresponds to the trap identification information Ia is newly established in the management database Db. The trap test results Ic and trap reference information Id about the managed traps T transmitted from the testing unit 2 are recorded in the management database Db at this point.

In addition, the portable PC 3 has a database display function whereby the four types of information Ia to Id about each of the managed traps T recorded in the management database Db are displayed on the display 15 in tabular form, as shown in FIG. 4. In this database display, the table on the display 15 is scrolled so as to display entries related to tested traps T specified by the trap identification information Ia that was read by the ID tag reader 4, or to tested traps T specified by operating the keyboard 14a, stylus 14b, or the like. In cases in which the information Ia to Id about each of the managed traps T has been written or rewritten by operating the keyboard 14a or the like, the content stored in the management database Db is subjected to a write or rewrite operation accordingly.

Figure 5:
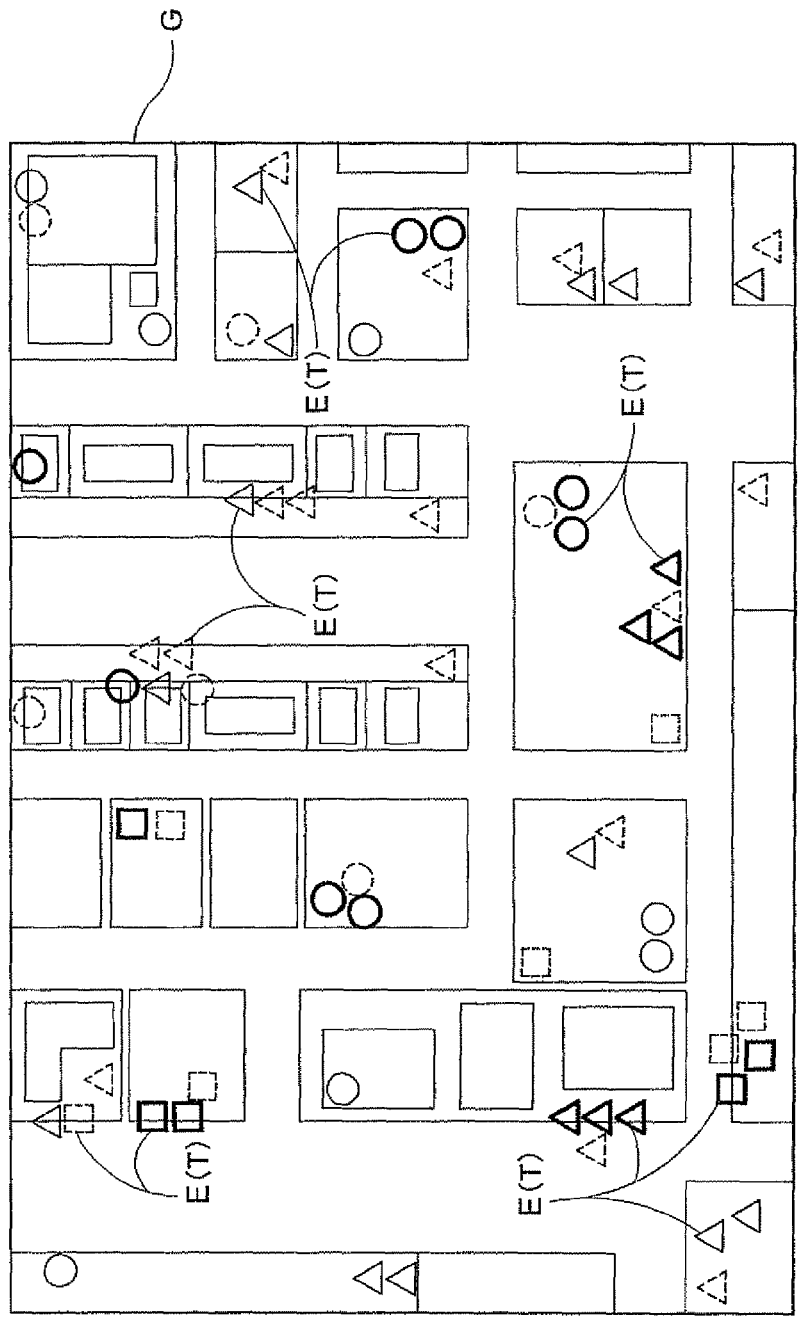
FIG. 5 is a view showing the display mode of a facility chart image.

The portable PC 3 (i.e., the management program Pb) has a mapping function and an analysis data creation function in addition to the database updating and creating function and the database display function described above. With the mapping function, a schematic facility chart image G showing the facility provided with a large group of managed traps T such as the one shown in FIG. 5 is displayed on the display 15 on the basis of facility chart information Dc stored on the hard disk 17. This display is provided instead of the above-described tabular database display shown in FIG. 4. In addition, display elements E (icons) that show individual tested traps T are overlaid on the facility chart image G and displayed on the display 15 in an arrangement that conforms to the actual trap positions. The overlaying is performed on the basis of the trap arrangement information Dd about each of the tested traps T that is stored on the hard disk 17 in the same manner.

When any of the display elements E displayed in the facility chart image G on the display 15 of the portable PC 3 is selected by operating the stylus 14*b* or the like and is designated for execution, the information Ia to Id about the managed trap T that corresponds to this display element E is read from the management database Db and displayed as a separate frame in the facility chart image G on the display 15.

In addition, as an analysis information creation function of the portable PC 3, the application of the corresponding trap T can be displayed using differences in the shape of the display elements E on the basis of the trap attribute information Ib of each of the managed traps T recorded in the management database Db, as shown in FIG. 5. In this case, a square indicates a general use, a triangle indicates a trace use, and a circle indicates the main pipeline use. Based on the trap test result Ic for each managed trap T cumulatively recorded in the management database Db, and depending on the differences in the border color or pattern of the display elements E, the number N of malfunctions of the corresponding trap T in the most recent preset period (e.g., 3 years) is displayed. In this example, a thin solid border indicates zero times, a thin broken border indicates a single time, and a thick solid border indicates a plurality of times.

As used herein, the term "number N of malfunctions (i.e., malfunctioning frequency in a preset period)" refers to the number of malfunctions experienced by managed traps T installed at a single installation site that accommodates the traps, rather than the number of malfunctions of a single managed trap T as such.

A single entry or a plurality of entries in any type of information Ia to Id about the managed traps T is similarly displayed as the analysis data creation function in the form of a tabular database display in the portable PC 3, as shown in FIG. 4. In this display, the classification categories (i.e., general use, trace use, main pipeline use, and other classification categories in the "application" entry) of these entries are specified as search conditions by operating the keyboard 14*a*, the stylus 14*b*, or the like, whereupon the information Ia to Id recorded in the management database Db is displayed in tabular form on the display 15 only for the managed traps T that belong to these classification categories. For example, specifying "float type" as a search condition for the model entry in the trap attribute information Ib causes the information Ia to Id recorded in the management database Db to be displayed on the display 15 only for float-type managed traps T.

Figure 6:
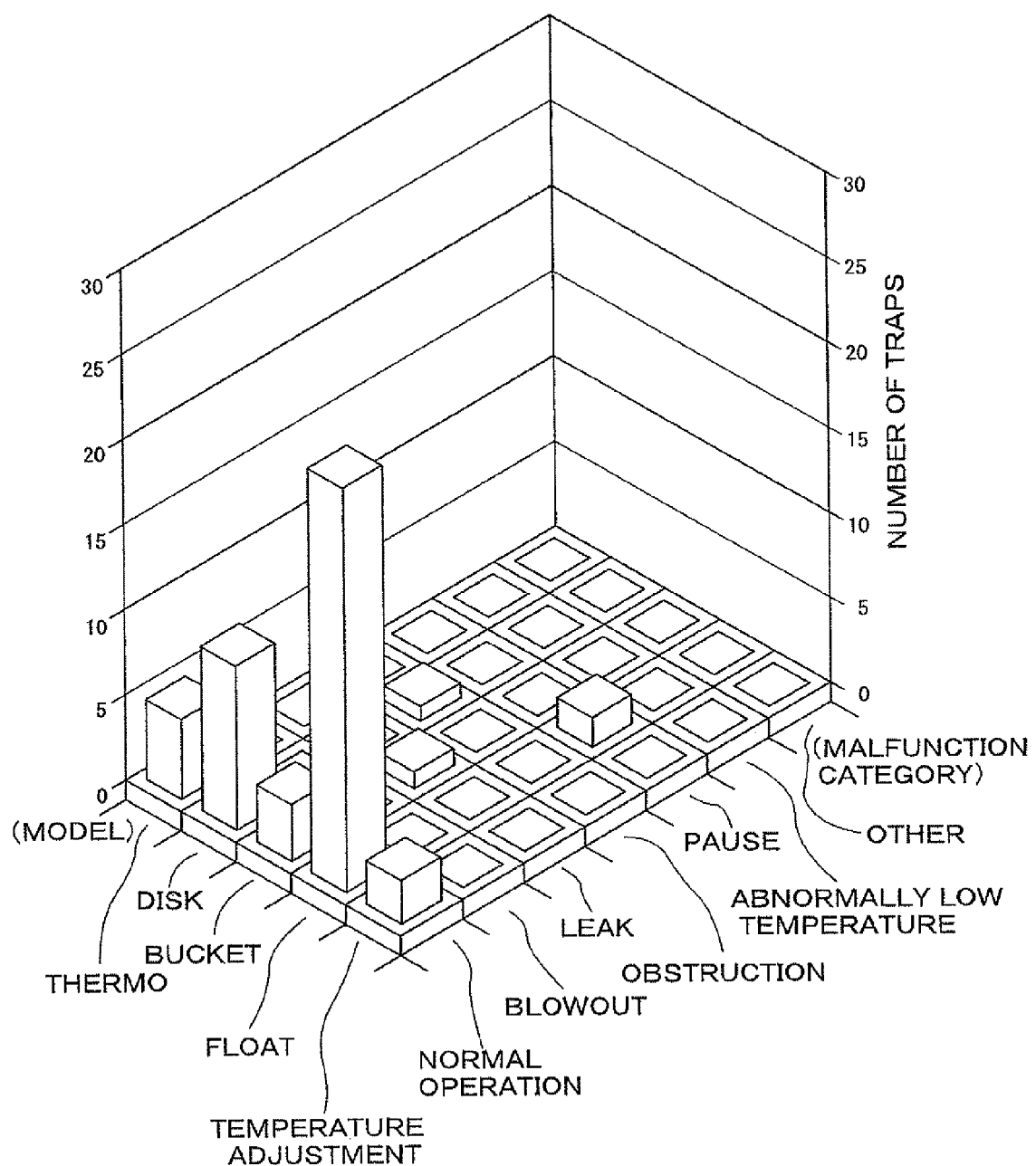
FIG. 6 is a view showing an analysis graph.
Figure 7:
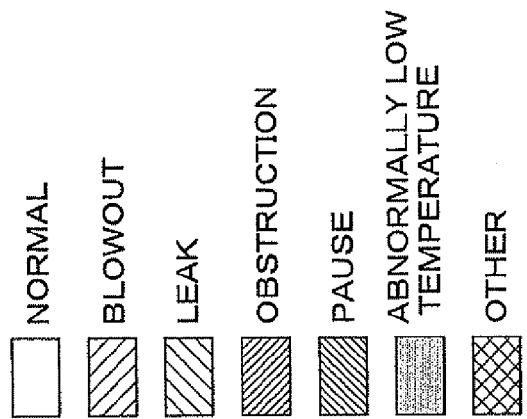
FIG. 7 is a view showing an analysis graph.
Figure 7:
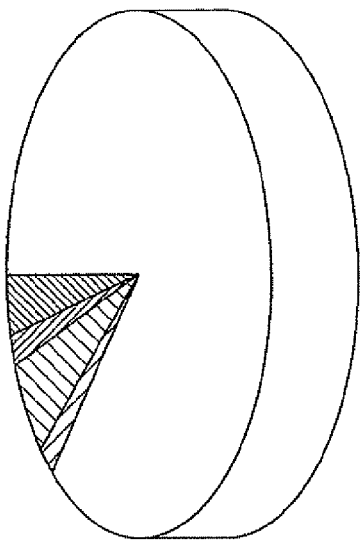
Figure 7:
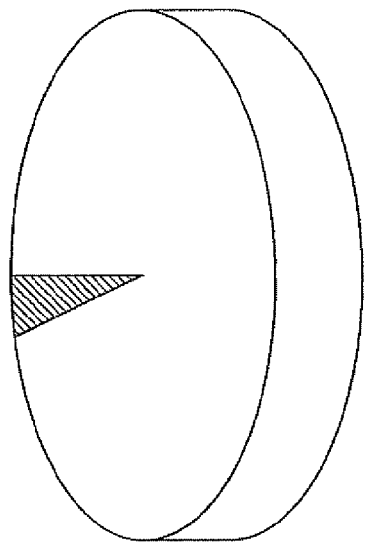

The portable PC 3 further has the following analysis data creation function. When a graphic display is specified in a state in which two entries selected from the information Ia to Id about the managed traps T are indicated by operating the keyboard 14*a*, stylus 14*b*, or the like, the number of traps belonging to the classification categories of one of the entries and the number of traps belonging to the classification categories of the other entry (i.e., the number of traps in each classification category for the second entry) are displayed on the display 15 on the basis of the information Ia to Id recorded in the management database Db. The display is in the form of a 3D bar graph, pie graph, or other specified graph. For example, a graph is displayed on the display 15, as shown in FIG. 6, by indicating a model entry in the trap attribute information Ib and indicating entries classified by the malfunction categories in the trap test result Ic for an arbitrary cycle, and specifying a graphic display based on a 3D bar graph. Also, a graph is displayed on the display 15, as shown in FIG. 7, by indicating entries classified by the malfunction categories in the trap test result Ic for a preceding cycle and indicating entries classified by the malfunction categories in the trap test result Ic for the current cycle, and specifying a graphic display based on a pie graph.

A large group of vapor traps T is managed according to the following sequence (a) to (f) using a management unit 1 configured as described above.

(a) It is determined by consultations with the trap management requester which of the vapor traps at a facility are to be designated as managed traps T. Specifically, it is determined based on discussions with the management requester whether all the vapor traps at the facility are to be designated as managed traps T, only the vapor traps in some of the sections at the facility are to be designated as managed traps T, only the vapor traps belonging to a specific vapor system in the facility are to be designated as managed traps T, or the like.

(b) Facility chart information Dc and trap arrangement information Dd, which are stored on the hard disk 17 of the portable PC 3, are created based on a facility arrangement chart, pipeline system chart, or the like presented by the management requester, and the facility chart information Dc and trap arrangement information Dd thus created are stored on the hard disk 17 of the portable PC 3.

(c) As an initial operation, the test operator brings the management unit 1 to the installation site of each of the managed traps T while consulting the facility chart image G displayed on the display 15 of the portable PC 3 and the display elements E on the facility chart image G, attaches an ID tag 13 to each of the managed traps T, and reads the trap identification information Ia by using the ID tag reader 4. Entries related to each of the managed traps T are thereby created by the database creation function in the management database Db of the hard disk 17 in the portable PC 3. In addition, the trap identification information Ia and the display elements E for each of the managed traps T are correlated by the operation of a stylus 14*b* or the like.

In addition to attaching ID tags 13 and reading the trap identification information Ia, the test operator also confirms the trap attribute information Ib and trap reference information Id for each of the managed traps T, and enters the trap attribute information Ib and trap reference information Id into the management database Db of the portable PC 3 by operating the keyboard 14*a*, stylus 14*b*, or the like. The management database Db is thus created anew for all the managed traps T.

Furthermore, the ID tags 13 are attached, the trap identification information Ia is read, and the trap attribute information Ib and trap reference information Id is entered. The test operator thereby enters trap attribute information Ib and trap reference information Id for each of the managed traps T into the memory 8 of the testing unit 2 from the management database Db of the portable PC 3 for each of the managed traps T. The testing unit 2 is used to test each of the managed traps T, and the test results Ic are stored in the memory 8 of the testing unit 2 and are entered into the management database Db of the portable PC 3.

(d) After the initial operation has concluded, the current condition (e.g., malfunction rate, total vapor leakage, monetary loss due to vapor leakage, and the like) of all the managed traps T is reported to the management requester on the basis of the trap test results Ic for the entire number of the managed traps T recorded in the management database Db of the portable PC 3. An initial overhaul is then performed by consultation with the management requester. The overhaul is either a complete overhaul in which the entire number of the managed traps T is replaced with recommended traps (e.g., traps with reduced vapor leakage when operating normally, traps more suitable for the installation conditions or service conditions, or the like), or a partial overhaul in which only malfunctioning managed traps T are repaired or replaced with recommended traps.

In the initial overhaul, the replaced or repaired devices are retested using the testing unit 2 to determine whether the devices operate normally or have a malfunction. The repair or replacement is completed for those of the managed traps T that have been confirmed by the retesting to operate normally. For those of the managed traps T that have been confirmed by the retesting to have a malfunction, the repair or replacement is repeated until the retesting confirms that the devices operate normally.

Once a replaced or repaired managed trap T is confirmed by the retesting to operate normally, a replacement or repair record is made for this managed trap T; i.e., the fact of the replacement or repair is recorded in the management database Db of the portable PC 3, as are the post-replacement or post-repair trap attribute information Ib, trap test result Ic, and trap reference information Id.

(e) After the initial operation is completed, a complete test is performed periodically, such as annually or semiannually. The testing unit 2 is used to test the entire number of the managed traps T (i.e., to perform a test in which trap identification information Ia is read by the ID tag reader 4 for each trap T, and the probe 9 is brought against the trap T) irrespective of whether a complete or partial overhaul was performed as the initial overhaul. Each time the complete test is performed, trap test results Ic about each of the managed traps T is added to the management database Db. If a malfunctioning trap is detected, this trap is repaired or replaced with a recommended trap.

In each cycle of complete testing, a replaced or repaired device is retested by the testing unit 2 to determine whether the device is operating normally or has a malfunction. This retesting is part of the complete test, similarly to an initial overhaul. A managed trap T that has been confirmed by the retesting to operate normally is not replaced or repaired, whereas a managed trap T that has been confirmed by the retesting to have a malfunction is repeatedly replaced or repaired until the retesting confirms that the device is operating normally. Once a replaced or repaired managed trap T is confirmed by the retesting to operate normally, a replacement or repair record is made for this managed trap T; i.e., the fact of the replacement or repair is added to the management database Db of the portable PC 3, as are the post-replacement or post-repair trap attribute information Ib, trap test result Ic, and trap reference information Id.

In each cycle of complete testing, another testing mode can be adopted instead of the testing mode in which the management unit 1 composed of a testing unit 2, portable PC 3, and ID tag reader 4 is used by the test operator as a portable unit to test each managed trap T in the same manner as during the previous cycle of initial overhauling accompanied by the creation of a management database Db. Specifically, it is also possible to adopt a testing mode in which only the testing unit 2 provided with an ID tag reader 4 is used by the test operator as a portable unit to test each managed trap T, and the trap test result Ic and trap reference information Id about each of the managed traps T recorded in the memory 8 of the testing unit 2 is collectively entered into the management database Db of the portable PC 3 after the test.

(f) The service condition of managed traps T, the cause of a malfunction, and the like are analyzed after each cycle of complete testing or in another suitable period by using an analysis data creation function of the portable PC 3 such as the one described above. Examples of analysis data creation functions include displaying the type of application based on the shape of a display element E, displaying the number N of malfunctions by the type of border on a display element E, displaying recorded information Ia to Id only for managed traps T of a specific classification category, or displaying a graph. The results of the analysis are reported to the management requester, and appropriate measures are taken for the facility based on the results.

Figure 8:
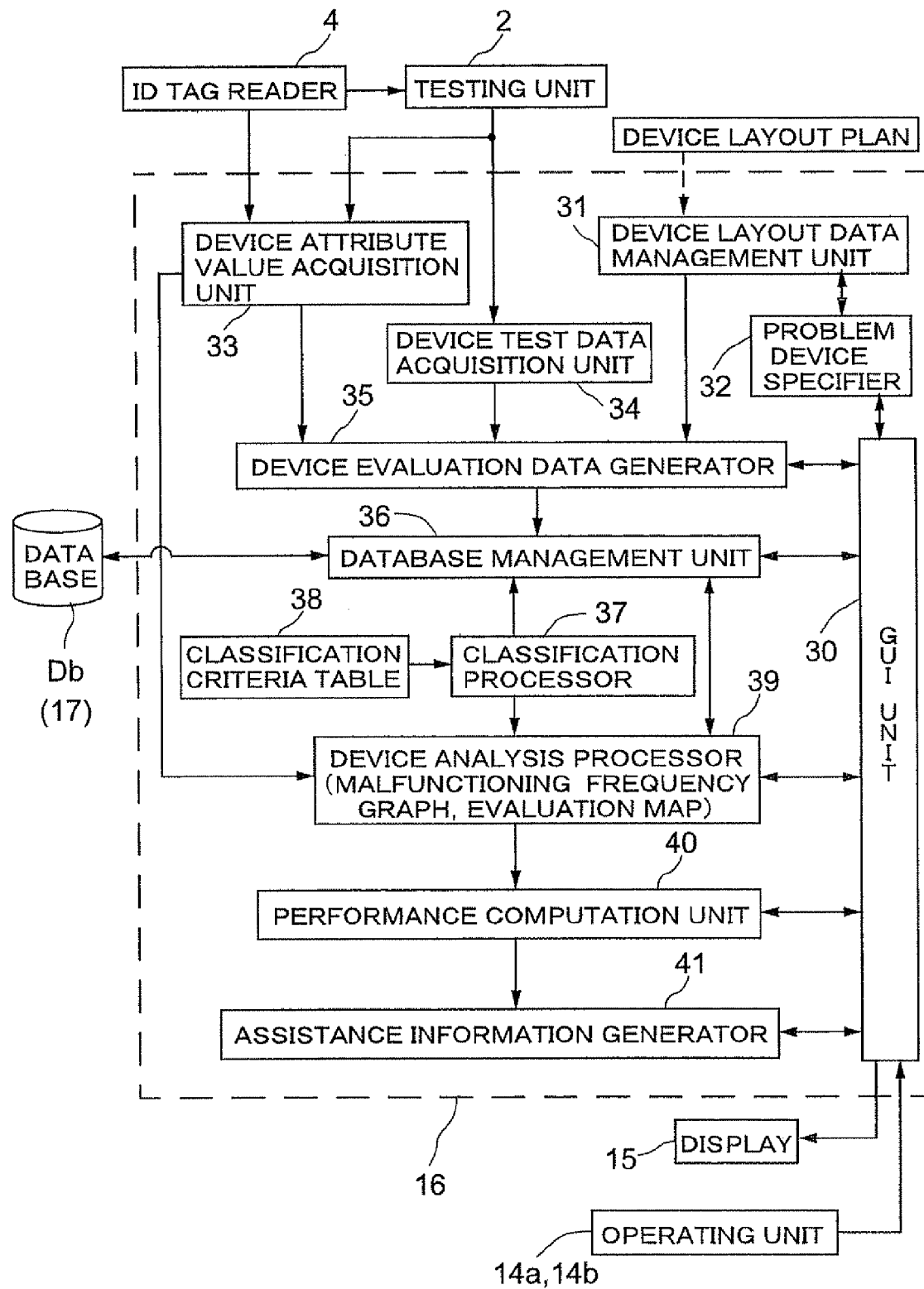
FIG. 8 is a functional block view of a portable PC.

In performing maintenance inspections on traps T and other plant facility devices (the term "trap T" has been used here in relation to such devices, but the word "device," which is a general term, will be adopted hereinbelow) at a plant facility, the above-described portable PC 3 uses a signal from the ID tag reader 4 or testing unit 2, and provides efficient assistance in performing maintenance inspections on plant facility devices. In particular, the computer provides efficient assistance to the operator when maintenance inspection is to be performed on a device used in a plant facility according to maintenance inspection guidelines. These guidelines include a complete overhaul strategy in which a complete overhaul is performed to replace the entire number of devices to be subjected to maintenance inspections with recommended devices, and a complete test involving the entire number of the managed devices is then periodically repeated; and a partial overhaul strategy in which a partial overhaul is performed to repair only those of the managed devices that have a malfunction, or to replace the malfunctioning devices with recommended devices, and a complete test involving the entire number of the managed devices is then periodically repeated. For this reason, the functions of the portable PC 3 are configured using programs and hardware such as those shown in FIG. 8.

Graphic user interfaces are extensively used in the portable PC 3 in order to transmit information to the operator in an easily understandable manner by presenting a graphic display via the display 15, and to allow comments to be entered by the simple operation of the operating units 14*a*, 14*b* via a graphic screen. The unit that implements such a graphic user interface is a GUI unit 30. This unit operates in close coordination with the OS installed on the portable PC 3, and is linked with a functional unit involved in the maintenance inspection operation assistance provided by the portable PC 3 and described below.

A device layout data management unit 31 performs a management task wherein device layout data is loaded from the outside. In the device layout data, device positions are linked to map data related to the plant site on the basis of device layout plan data digitized so as to indicate the layout of devices scheduled for maintenance inspections. When each device is subjected to a maintenance inspection, an assistance screen such as the one shown in FIG. 5 is displayed on the display 15 on the basis of the device layout data managed by the device layout data management unit 31, and the operator is notified of problem devices, which are devices that need to undergo a maintenance inspection next. Problem devices specified by the operator are confirmed by a problem device specifier 32. An identification symbol (trap identification information Ia) that is read by the ID tag reader 4 from an ID tag 13 attached to a problem device can be used as a key code for a device attribute value (trap attribute information Ib) stored in the memory 8 of the testing unit 2 in the above-described embodiment. Therefore, a device attribute value of the device specified by the identification symbol can be acquired by the portable PC 3. A device attribute value acquisition unit 33 is provided in order to acquire the device attribute value of the device specified via the ID tag 13 in this manner. The device specified by the ID tag 13, i.e., the problem device, is tested by the testing unit 2, whereby a test signal (trap test result Ic) sent from the testing unit 2 is processed by a device test data acquisition unit 34 as device test data that shows whether each device is operating normally or has a malfunction.

The device attribute values acquired by the device attribute value acquisition unit 33 and device test data acquired by the device test data acquisition unit 34 are sent to a device evaluation data generator 35, and are combined there in a mode in which the corresponding devices are linked to specific identification symbols to form device evaluation data. The device evaluation data thus generated for each of the problem devices is stored in a database Db. The device evaluation data for each device is stored in the database Db each time a periodic maintenance inspection operation is performed, and this device evaluation data is treated as history information about each of the devices. For this reason, a database management unit 36 is provided for recording the device evaluation data in the database Db after a history code (date or the like) is added so that the history [of each device] can be managed, and extracting device evaluation data that matches search conditions in which history conditions are also included. Since the devices recorded in the database Db are sorted into a large group of classification categories in accordance with the specifications of these devices, a classification that corresponds to these classification categories is needed when the device evaluation data is analyzed and on other occasions. A function is therefore provided wherein the device evaluation data is classified while a classification processor 37 accesses the database Db and references a classification criteria table 38 via the database management unit 36.

A device analysis processor 39 for analyzing the operational state of each device on the basis of the history of the device evaluation data has an algorithm for performing a statistical analysis in terms of malfunctioning frequency as described above, and also has a visualizing algorithm for visually representing the analysis results in the form of a graph, map, or other format. Since the malfunctioning frequency is significantly affected by the location or the conditions of use, the device evaluation data serving as the analysis source is used in accordance with the analysis target either in the form of data directly extracted from the database Db or in the form of data classified by the classification processor 37.

For the analysis results and the like obtained by the device analysis processor 39 to be used in performing maintenance inspections in a plant facility, a performance computation unit 40 is provided with a function whereby the malfunction rate, total vapor leakage, monetary loss due to vapor leakage, and the like of each device are calculated and the economic results of the maintenance inspection operation are computed on the basis of the analysis results and of device evaluation data obtained from the database Db via the database management unit 36.

The following types of maintenance inspection guidelines have been offered for use in the maintenance inspection of plant facility devices: a complete overhaul strategy in which a complete overhaul is performed to replace the entire number of devices to be subjected to maintenance inspections with recommended devices, and a complete test involving the entire number of the managed devices is then periodically repeated; and a partial overhaul strategy in which a partial overhaul is performed to repair only those of the managed devices that have a malfunction, or to replace the malfunctioning devices with recommended devices, and a complete test involving the entire number of the managed devices is then periodically repeated. Selection of either of the two strategies as appropriate varies with each plant facility. Therefore, the problem of which of the strategies to select in accordance with the plant facility scheduled for a maintenance inspection can be resolved by evaluating past performance. An assistance information generator 41 is accordingly provided. The assistance information generator 41 has an algorithm for generating support information (economic effects of each strategy at a variety of plant facilities, and the like) whereby either of the above-described two strategies is selected as a maintenance inspection guideline on the basis of economic effects evaluated by the performance computation unit 40. The algorithm for generating such support information can be constructed in a simple manner by adopting a decision theory system such as a neural network or an expert system. The assistance information generator 41 has an algorithm for selecting a recommended device for use in a specific site based on the analysis results, and is able to appraise the operator of a recommended device when a device is to be replaced at a specific site.

Other Embodiments

Other embodiments of the present invention are described next.

Vapor traps are given as examples of managed devices in the above-described embodiment, but the managed devices used in the implementation of the present invention are not limited to vapor traps alone, and may also include various valves or tanks, as well as production equipment and machine tools.

According to the above embodiment, there is presented a device management method for classifying individual devices to be managed (traps to be managed) into a plurality of classification categories (e.g., normal use, trace use, and main pipeline use) according to a prescribed classification criterion (e.g., by application), and, based on test results for a complete test spanning a plurality of cycles and on the classification category to which each of the managed devices belongs, for creating analysis data indicating the malfunctioning frequency for each of the managed devices, the malfunctioning frequency for each of the managed devices by the classification category, and a relation between the malfunctioning frequency and the plurality of classification categories.

It is also possible, however, to instead adopt a device management method for classifying individual devices to be managed into a plurality of classification categories for each of a plurality of prescribed classification criteria (e.g., by application) according to the classification criteria (e.g., normal use, trace use, main pipeline use, and other classification categories; and float-type, bucket-type, disk-type, and other classification categories), and, based on test results for a complete test spanning a plurality of cycles and on the classification category for each of the classification criteria to which each of the managed devices belongs, for creating analysis data indicating the relation between the malfunctioning frequency and the plurality of classification categories for each of the classification criteria for each of the managed devices, or analysis data indicating the malfunctioning frequency of each of the managed devices by the classification category for each of the classification criteria.

According to the above embodiment, there is presented an analysis system having arithmetic means for creating, in accordance with a preset program and on the basis of test results for a complete test spanning a plurality of cycles and the prescribed classification category for individual devices to be managed as stored in storage means, analysis data indicating the malfunctioning frequency for each of the managed devices, the malfunctioning frequency for each of the managed devices by the classification category, and a relation between the malfunctioning frequency and the plurality of classification categories.

It is also possible, however, to instead adopt an analysis system having input means for inputting a test result of a complete test and a classification category for each of a plurality of prescribed classification criteria to which individual devices to be managed belong; storage means for accumulating and storing the test result of each cycle of the complete test that has been input by the input means; and arithmetic means for creating, in accordance with a preset program, analysis data indicating the malfunctioning frequency for each of the managed devices, the malfunctioning frequency for each of the managed devices by the classification category, and a relation between the malfunctioning frequency and the plurality of classification categories. The analysis data is created on the basis of test results for the complete test spanning a plurality of cycles and the associated classification category for each of the classification criteria for each of the managed devices, as stored in the storage means.

INDUSTRIAL APPLICABILITY

The present invention can be applied to the management or support of maintenance inspection operations involving a large group of devices typified by vapor traps, valves, and other devices installed in a plant.

The invention claimed is:

1. An analysis system comprising:
input means for inputting a test result of a complete test involving the entire number of devices in a group of managed devices to determine whether the devices are operating normally or have a malfunction;
storage means for accumulating and storing the test result of each cycle of the complete test that has been input by the input means;
arithmetic means for creating from the test results stored in the storage means in accordance with a preset program, analysis data that shows a malfunctioning frequency of the device at each installation site of each of the managed devices; and
a display unit for displaying the analysis data created by the arithmetic means; and
an ID tag reader for reading identification information of the managed device from an ID tag attached to a corresponding device;
wherein
the storage means is configured to accumulate and store the test result of the managed device input by the input means, the test result being correlated with the identification information of the corresponding device read by the ID tag reader;
the display unit configured to display a facility chart image showing a facility provided with a group of the managed devices, and
a display element that shows each of the managed devices overlaid on the facility chart image at a position that conforms to an installation position of the managed device;
the arithmetic means configured to correlate the identification information read by the ID tag reader for each managed device with the display elements on the facility chart image when a correlating operation is conducted with reference to the display elements on the facility chart image displayed on the display unit; and
the display unit is configured to display the malfunctioning frequency of the managed device specified by the identification information using the corresponding display elements on the facility chart image as an indication of the analysis data.

2. An analysis system according to claim 1, wherein,
input means configured to input the test result of the complete test and a classification category to which each of the managed devices belongs;
the storage means configured to accumulate and store the test result of each cycle of the complete test that has been input by the input means, and the associated classification category for each of the managed devices as input by the input means; and
arithmetic means configured to create in accordance with a preset program, analysis data indicating the relation between the malfunctioning frequency and the plurality of classification categories or analysis data that shows the malfunctioning frequency by classification category, based on the test result of the complete test that spans a plurality of cycles and the associated classification category to which each of the managed devices belongs, as stored in the storage means.

3. An analysis system according to claim 1, wherein,
an input means configured to input the test result of the complete test and a classification category for each of a plurality of predetermined classification criteria to which each of the managed devices belongs;
the storage means configured to accumulate and store the test result of each cycle of the complete test that has been input by the input means, and the associated classification category for each of the managed devices as input by the input means; and
the arithmetic means configured to create, in accordance with a preset program, analysis data indicating the relation between the malfunctioning frequency and the plurality of classification categories for each of the classification criteria or analysis data that shows the malfunctioning frequency of each of the managed devices by classification category for each of the classification criteria, based on the test result of the complete test that spans a plurality of cycles and the associated classification category for each of the classification criteria to which each of the managed devices belongs, as stored in the storage means.

* * * * *

UNITED STATES PATENT AND TRADEMARK OFFICE
CERTIFICATE OF CORRECTION

PATENT NO. : 8,494,811 B2
APPLICATION NO. : 11/996542
DATED : July 23, 2013
INVENTOR(S) : Fujiwara et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1265 days.

Signed and Sealed this
Fifteenth Day of September, 2015

Michelle K. Lee
*Director of the United States Patent and Trademark Office*